(12) United States Patent
Neppalli (10) Patent No.: US 8,667,248 B1
(45) Date of Patent: Mar. 4, 2014

(54) DATA STORAGE DEVICE USING METADATA AND MAPPING TABLE TO IDENTIFY VALID USER DATA ON NON-VOLATILE MEDIA

(75) Inventor: Srinivas Neppalli, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 239 days.

(21) Appl. No.: 13/162,035

(22) Filed: Jun. 16, 2011

Related U.S. Application Data

(60) Provisional application No. 61/378,880, filed on Aug. 31, 2010.

(51) Int. Cl.
*G06F 12/00* (2006.01)

(52) U.S. Cl.
USPC .... 711/202; 711/161; 711/162; 711/E12.103; 711/E12.009; 707/640; 707/642; 707/648; 707/654

(58) Field of Classification Search
None
See application file for complete search history.

(56) References Cited

U.S. PATENT DOCUMENTS

| | | | | |
|---|---|---|---|---|
| 5,542,065 A * | 7/1996 | Burkes et al. | ................. | 711/114 |
| 5,742,792 A * | 4/1998 | Yanai et al. | ................... | 711/162 |
| 6,378,035 B1 * | 4/2002 | Parry et al. | ..................... | 711/110 |
| 6,463,486 B1 * | 10/2002 | Parry et al. | ...................... | 710/52 |
| 6,671,791 B1 * | 12/2003 | McGrath | ...................... | 711/206 |
| 6,681,290 B2 * | 1/2004 | Brower et al. | ................. | 711/114 |
| 6,704,813 B2 * | 3/2004 | Smirnov et al. | ................ | 710/52 |
| 6,745,283 B1 * | 6/2004 | Dang | ........................... | 711/113 |
| 6,748,481 B1 * | 6/2004 | Parry et al. | .................... | 711/100 |
| 6,772,274 B1 | 8/2004 | Estakhri | | |
| 6,820,144 B2 * | 11/2004 | Smirnov et al. | ................ | 710/52 |
| 6,839,802 B2 * | 1/2005 | Dimitri et al. | ................ | 711/112 |
| 6,886,068 B2 | 4/2005 | Tomita | | |
| 6,901,479 B2 | 5/2005 | Tomita | | |
| 6,934,818 B2 * | 8/2005 | Okada | .......................... | 711/154 |
| 7,054,249 B2 * | 5/2006 | Okada | ....................... | 369/53.11 |
| 7,089,348 B2 * | 8/2006 | Parry et al. | .................... | 711/100 |
| 7,117,309 B2 * | 10/2006 | Bearden | ....................... | 711/137 |
| 7,139,868 B2 * | 11/2006 | Parry et al. | .................... | 711/110 |
| 7,139,869 B2 * | 11/2006 | Parry et al. | .................... | 711/110 |
| 7,146,458 B2 * | 12/2006 | Smirnov et al. | ............... | 711/110 |
| 7,149,868 B2 * | 12/2006 | Parry et al. | .................... | 711/170 |
| 7,152,149 B2 * | 12/2006 | Shimada et al. | ............. | 711/165 |
| 7,165,140 B2 * | 1/2007 | Dandrea et al. | ............... | 711/114 |
| 7,293,133 B1 * | 11/2007 | Colgrove et al. | ............. | 711/111 |
| 7,334,078 B2 * | 2/2008 | Parry et al. | .................... | 711/100 |
| 7,366,859 B2 * | 4/2008 | Per et al. | ....................... | 711/162 |
| 7,412,585 B2 * | 8/2008 | Uemura | ........................ | 711/207 |
| 7,430,592 B2 * | 9/2008 | Schmidt et al. | ............... | 709/220 |
| 7,502,872 B2 * | 3/2009 | Boyd et al. | ........................ | 710/1 |

(Continued)

*Primary Examiner* — Charles Rones
*Assistant Examiner* — Christopher Birkhimer (57) ABSTRACT

A data storage device is disclosed including a non-volatile media having a first and a second plurality of physical locations, the first plurality of physical locations storing user data and the non-volatile media storing first metadata associating each of the first plurality of physical locations with a logical block address (LBA), and a mapping table including a mapping of each LBA to a current physical location. The data storage device further includes control circuitry that reads the first metadata to obtain a first plurality of LBAs, reads the mapping table to determine a current physical location for the first plurality of LBAs, and compares the current physical location of each of the first plurality of LBAs to a corresponding one of the first plurality of physical locations to identify valid user data in the first plurality of physical locations for migration into the second plurality of physical locations.

24 Claims, 5 Drawing Sheets

(56) References Cited

U.S. PATENT DOCUMENTS

| | | |
|---|---|---|
| 7,529,880 B2 | 5/2009 | Chung et al. |
| 7,558,918 B2 * | 7/2009 | Parry et al. ............... 711/118 |
| 7,562,181 B2 * | 7/2009 | Sinclair et al. ............. 711/103 |
| 7,574,580 B2 * | 8/2009 | Mahashin et al. ........... 711/221 |
| 7,581,058 B2 * | 8/2009 | Takase et al. .............. 711/103 |
| 7,603,530 B1 | 10/2009 | Liikanen et al. |
| 7,716,441 B2 * | 5/2010 | Kano ....................... 711/165 |
| 2003/0221055 A1 * | 11/2003 | Okada ...................... 711/113 |
| 2004/0064640 A1 * | 4/2004 | Dandrea et al. ............ 711/114 |
| 2004/0109376 A1 | 6/2004 | Lin |
| 2005/0144517 A1 | 6/2005 | Zayas |
| 2005/0235112 A1 * | 10/2005 | Parry et al. ................ 711/118 |
| 2005/0235113 A1 * | 10/2005 | Smirnov et al. ............ 711/118 |
| 2005/0240730 A1 * | 10/2005 | Parry et al. ................ 711/118 |
| 2006/0008257 A1 * | 1/2006 | Mahashin et al. ........... 386/124 |
| 2006/0015681 A1 * | 1/2006 | Park ......................... 711/112 |
| 2006/0117161 A1 | 6/2006 | Venturi |
| 2007/0094445 A1 | 4/2007 | Trika et al. |
| 2007/0204100 A1 | 8/2007 | Shin et al. |
| 2007/0204128 A1 | 8/2007 | Lee et al. |
| 2007/0226394 A1 | 9/2007 | Noble |
| 2008/0091877 A1 * | 4/2008 | Klemm et al. ............. 711/114 |
| 2008/0098195 A1 | 4/2008 | Cheon et al. |
| 2008/0183955 A1 | 7/2008 | Yang et al. |
| 2008/0195801 A1 | 8/2008 | Cheon et al. |
| 2008/0270680 A1 | 10/2008 | Chang |
| 2009/0055620 A1 | 2/2009 | Feldman et al. |
| 2009/0113160 A1 * | 4/2009 | Ferraro ..................... 711/170 |
| 2009/0119353 A1 | 5/2009 | Oh et al. |
| 2009/0154254 A1 | 6/2009 | Wong et al. |
| 2009/0164696 A1 | 6/2009 | Allen et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2010/0082543 A1 * | 4/2010 | Nagarajan ................. 707/640 |

* cited by examiner

DATA STORAGE DEVICE USING METADATA AND MAPPING TABLE TO IDENTIFY VALID USER DATA ON NON-VOLATILE MEDIA

CROSS-REFERENCE TO RELATED APPLICATIONS

The present application claims priority from co-pending provisional U.S. Patent Application Ser. No. 61/378,880, filed on Aug. 31, 2010, the specification of which is incorporated herein by reference.

BACKGROUND

Data storage devices, such as disk drives and solid state drives, can use "logical block address (LBA) indirection" to store user data on non-volatile media, such as a disk surface or Flash memory, wherein data for LBAs are not typically stored in the same physical location each time they are written. For example, if data is written to LBA 0, it may be stored in physical location 0 on the non-volatile media. But if it is written again later, it may be stored in a new physical location, such as physical location 20. Thus, with LBA indirection, a physical location on the non-volatile media may contain data for any LBA. When a host rewrites a particular LBA on a storage device with LBA indirection, the older copy of the LBA and associated user data is not overwritten or erased. The more recent copy of the LBA is written into a new physical location, thereby invalidating the user data stored in the old physical location.

In order to reuse old physical locations containing invalid data, a region of the non-volatile media containing the old physical locations can be erased. However, before erasing the region containing the invalid data, a garbage collection operation is typically performed to identify and migrate into another region any valid data that is stored in physical locations located in the same region of the non-volatile media as the invalid data.

There is, therefore, a need to efficiently identify valid user data on non-volatile media of a data storage device for migration during a garbage collection operation.

DETAILED DESCRIPTION

Figure 1A:
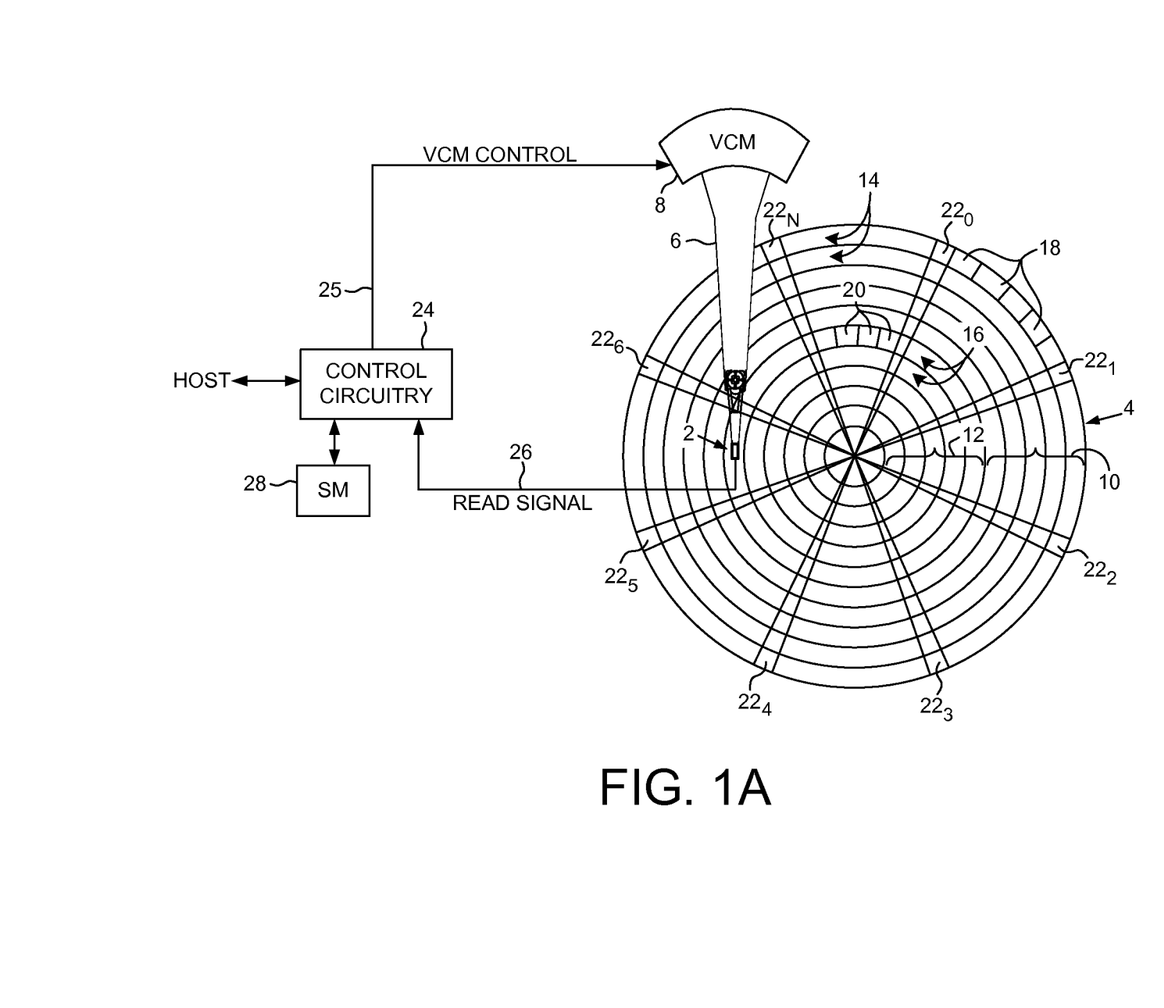
FIG. 1A shows an example data storage device according to an embodiment of the present invention comprising a disk surface having a first zone comprising a plurality of physical locations and a second zone comprising a plurality of physical locations, a head actuated over the disk surface, a semiconductor memory (SM), and control circuitry, wherein LBA indirection is used to store user data in the physical locations on the disk surface.

FIG. 1A shows a data storage device according to an embodiment of the present invention comprising a head 2 actuated radially over a disk surface 4 by an actuator arm 6, and a voice coil motor (VCM) 8 operable to rotate the actuator arm 6 about a pivot. The disk surface 4 comprises first and second zones 10 and 12, wherein the first zone 10 comprises a plurality of data tracks 14 and the second zone 12 comprises a plurality of data tracks 16. Each track 14 comprises a plurality of physical locations 18 and each track 16 comprises a plurality of physical locations 20. The plurality of physical locations 18 and 20 can be used by the host for reading and writing user data. In one embodiment, the first zone 10 is a high performance zone and the second zone 12 is a low performance zone. In an alternate embodiment of the invention, the disk surface 4 comprises a single zone comprising a plurality of data tracks. In another embodiment, the disk surface 4 comprises more than two zones, wherein each zone comprises a plurality of data tracks.

In the embodiment in FIG. 1A, the disk surface 4 further comprises a plurality of embedded servo sectors $22_1$-$22_N$ that define the tracks 14 in zone 10 and the tracks 16 in zone 12. The disk drive further comprises control circuitry 24, which is operable to process a read signal 26 emanating from the head 2 to demodulate the embedded servo sectors $22_1$-$22_N$ and generate a position error signal (PES). The PES represents a radial offset of the head 2 from a target track 14 in the first zone 10 or a target track 16 in the second zone 12. The control circuitry 24 is further operable to process the PES with a suitable servo compensator to generate a VCM control signal 25 applied to the VCM 8. The VCM 8 rotates the actuator arm 6 about a pivot in order to actuate the head 2 radially over the disk surface 4 in a direction that decreases the PES.

The disk drive further comprises a semiconductor memory (SM) 28 communicatively coupled to the control circuitry 24. The SM 28 can comprise, for example, dynamic random access memory (DRAM), Flash memory, or static random access memory (SRAM). The SM 28 further comprises a buffer for temporarily storing write user data received from the host via a write command and read user data requested by the host via a read command.

In the embodiment in FIG. 1A, logical block address (LBA) indirection is used to store user data in the plurality of physical locations 18 and 20 on the disk surface 4, wherein an LBA is generally stored in a different physical location each time it is written by the host. Thus, each of the plurality of physical locations 18 and 20 on the disk surface 4 may contain any LBA. In one embodiment, user data is written in each of the physical locations 18 and 20 sequentially in one direction. In an embodiment of the present invention, the tracks 14 and 16 on the disk surface 4 are written in a shingled manner such that a previously written track is partially overwritten.

In the embodiment of FIG. 1A, metadata associates each of the physical locations 18 on each of the tracks 14 with an LBA and user data. In an embodiment of the present invention, the metadata associating an LBA with each of the physical locations 18 on a track 14 is stored on the same track 14. In one embodiment, the metadata is stored in a physical location located at the head of each track. In another embodiment, the metadata is stored in a physical location located at the end of each track. In one embodiment of the present invention, the metadata is stored in a physical location located at the head of each track and at a physical location located at the middle of each track. In one embodiment, the metadata that associates each of the physical locations 18 on each of the tracks 14 with an LBA and user data is stored in a single physical location on the disk surface 4. For example, the single physical location can be located on one of the tracks 14 in the first zone 10. In one embodiment, the metadata associated with each of the physical locations 18 and 20 on the disk surface 4 is located in non-volatile semiconductor memory (e.g., Flash memory) in the disk drive.

The disk drive in FIG. 1A further comprises a mapping table comprising a mapping of each LBA in each of the physical locations on the disk surface 4. The mapping table can be stored, for example, in a physical location on the disk surface 4.

In one embodiment, the mapping table is stored in non-volatile semiconductor memory (e.g., Flash memory) in the disk drive.

Figure 1B:
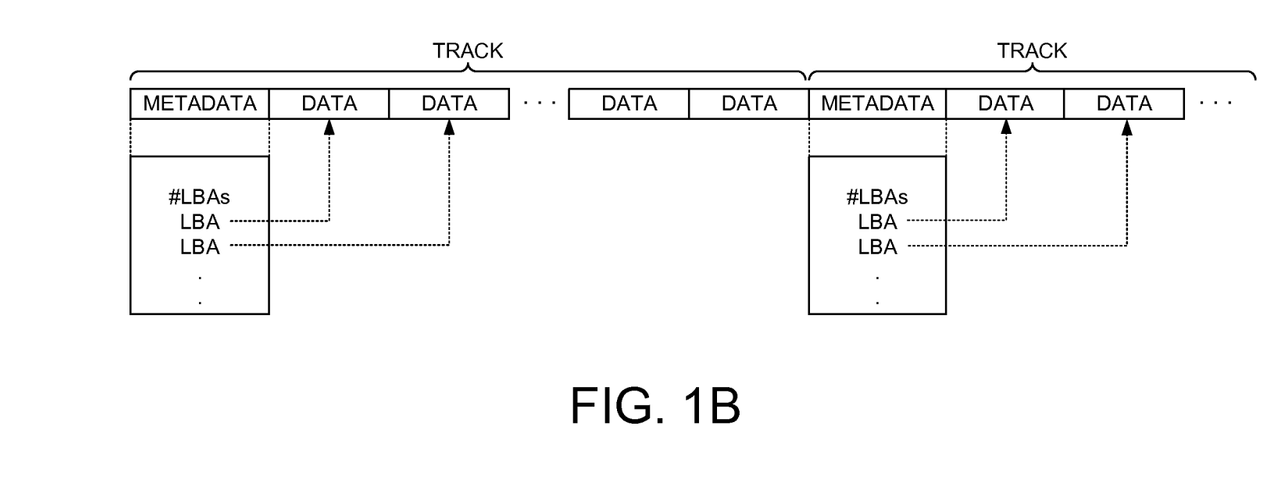
FIG. 1B shows an embodiment of the present invention comprising tracks, wherein each track comprises physical locations for storing user data and metadata that associates each physical location with an LBA.

FIG. 1B shows an embodiment of the present invention wherein metadata is written in a physical location at the head of each track on the disk surface and the metadata associates each physical location on the track with an LBA and user data. In the embodiment in FIG. 1B, the metadata includes a number of LBAs (#LBAs), wherein each LBA is associated with written user data in one of the physical locations on the track. In one embodiment, metadata can be stored in a physical location at the head of each track and in a physical location at the middle of each track. In another embodiment, the metadata can be stored in a physical location at the end of the track.

Figure 2A:
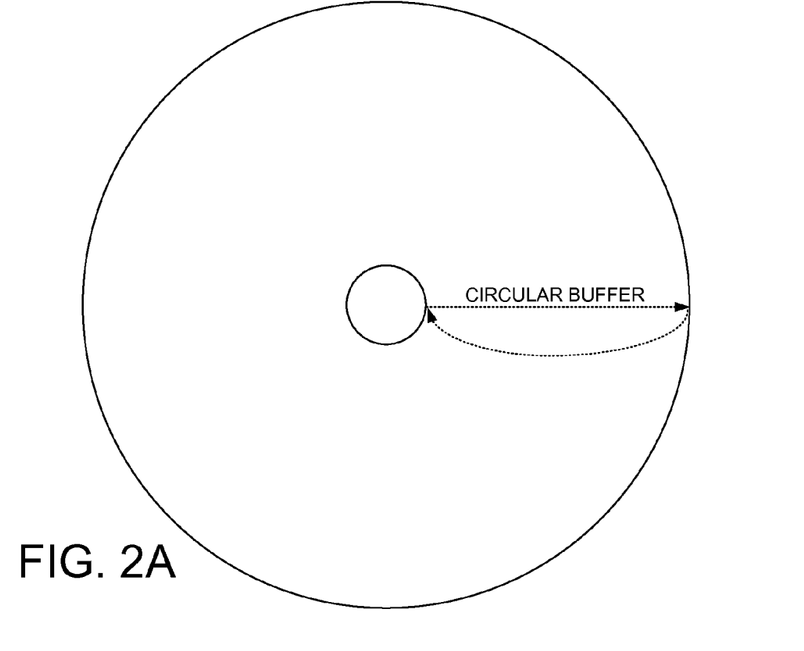
FIG. 2A shows an embodiment of the present invention wherein a disk surface comprises a circular buffer.

FIG. 2A shows an embodiment of the present invention wherein a circular buffer spans substantially the entire disk surface, and data is written from an inner diameter (ID) of the disk toward an outer diameter (OD) of the disk surface. Accordingly, the circular buffer comprises a head for writing new data and a tail that identifies invalid data that was previously "overwritten". In one embodiment, the data is written in the circular buffer from the OD toward the ID of the disk surface. In one embodiment, the tracks are written in a shingled manner such that a previously written track is partially overwritten. Writing data in one direction (always at the head of the circular buffer) ensures that a previously written track is partially overwritten only on one side. In other embodiments, a circular buffer may be implemented on the disk surface without shingled writing.

Figure 2B:
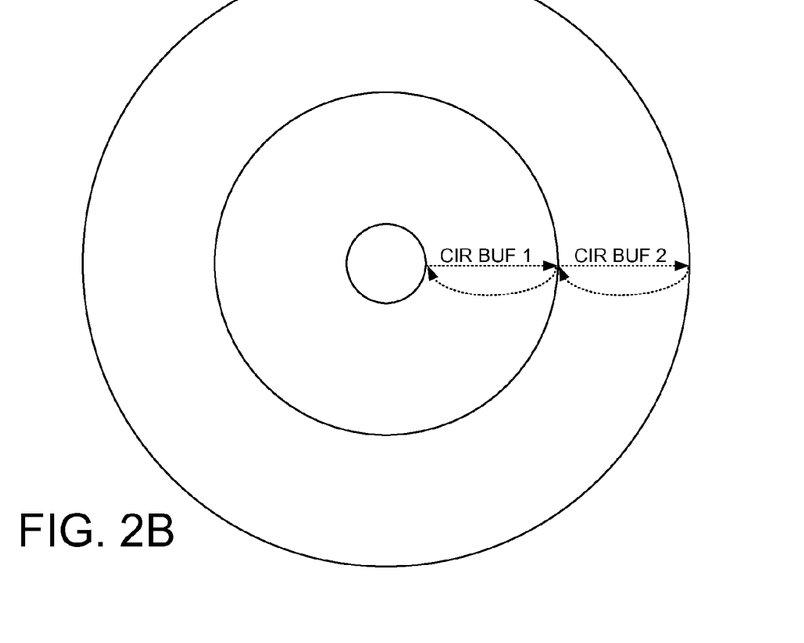
FIG. 2B shows an embodiment of the present invention wherein a disk surface comprises two circular buffers.

FIG. 2B shows an embodiment of the present invention wherein the control circuitry 24 defines two circular buffers on the disk surface 4 which may be selected to service write commands received from the host as well as garbage collection writes using any suitable algorithm. In the embodiment of FIG. 2B, the first and second circular buffers are written from the ID toward the OD. In another embodiment, the first and second circular buffers are written from the OD toward the ID. In one embodiment, a first circular buffer is written from the ID to the middle diameter (MD), and a second circular buffer is written from the OD to the MD. In another embodiment of the present invention, the control circuitry 24 defines more than two circular buffers on the disk surface. In another embodiment, the present invention applies to more than one disk surface of a data storage device. For example, the metadata may be written on a different disk surface than the associated user data and LBAs, and/or the circular buffers may span more than one disk surface.

Figure 3A:
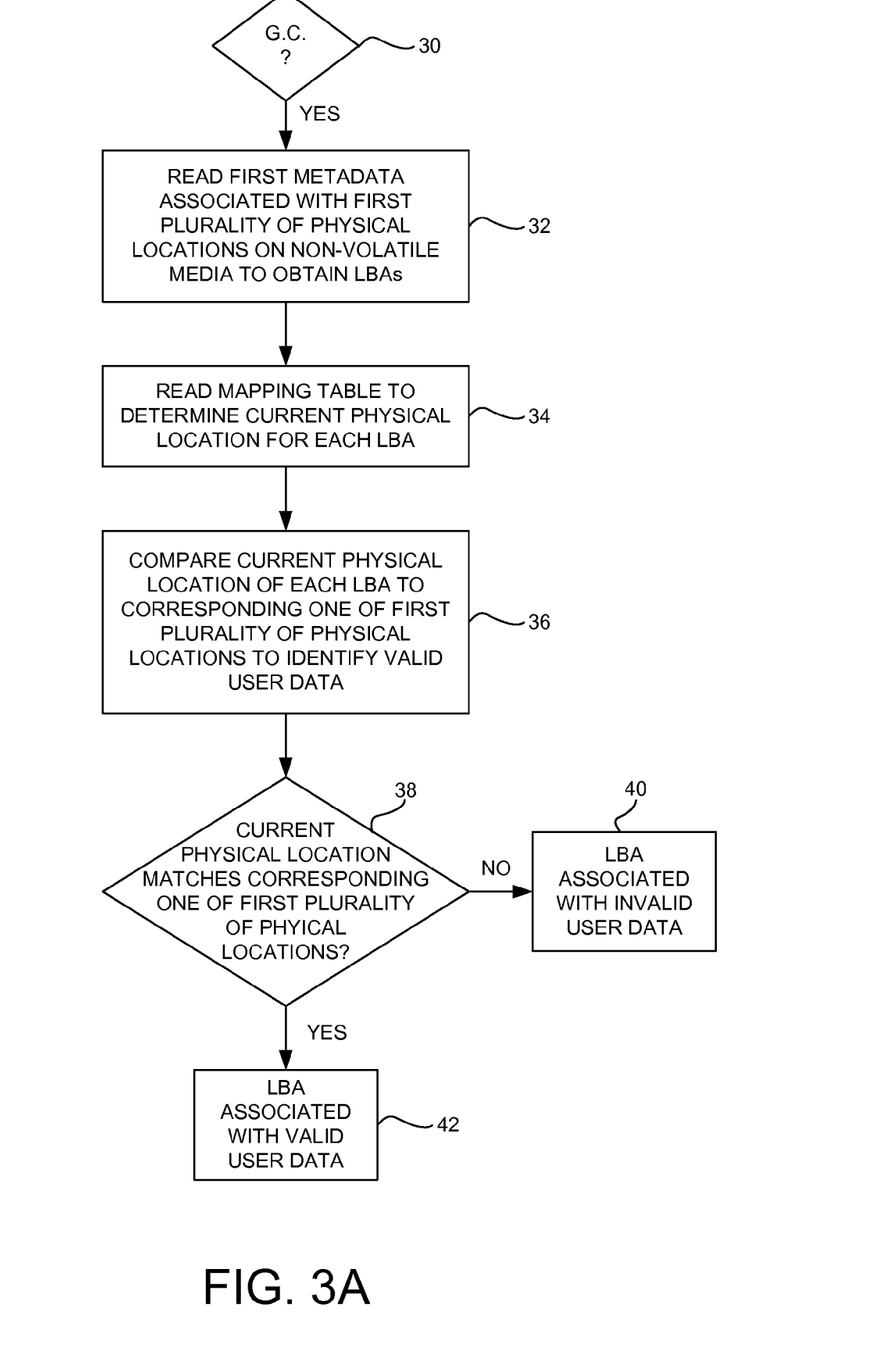
FIG. 3A is a flow diagram according to an embodiment of the present invention wherein first metadata associated with a first plurality of physical locations is read to obtain a plurality of LBAs, and valid user data is identified by comparing a current physical location of each of a plurality of LBAs to a corresponding one of the first plurality of physical locations during a garbage collection operation.

FIG. 3A is a flow diagram executed by the control circuitry 24 according to an embodiment of the present invention, wherein the control circuitry 24 executes a garbage collection operation on the disk surface (step 30). The control circuitry 24 reads first metadata associated with a first plurality of physical locations 18 on a non-volatile media (e.g., disk surface 4) (step 32). The first plurality of physical locations 18 can be located, for example, on at least one track 14 in the first zone 10 on the disk surface 4. In one embodiment of the present invention, the first plurality of physical locations 18 is located at the tail of a circular buffer on the disk surface 4. In one embodiment, the first metadata is located on the at least one track 14. In another embodiment, the first metadata is located in a physical location 18 in the first zone 10. In an embodiment of the invention, the first metadata is located in non-volatile semiconductor memory (e.g., Flash memory). The control circuitry 24 reads a mapping table to determine the current physical location for each LBA (step 34). The mapping table comprises a mapping of each LBA to a current physical location on the disk surface 4.

In the embodiment shown in the flow diagram in FIG. 3A, the control circuitry 24 compares the current physical location of each LBA to a corresponding one of the first plurality of physical locations 18 to identify valid user data (step 36). The control circuitry 24 determines whether the current physical location matches a corresponding one of the first plurality of physical locations 18 (step 38). If the current physical location does not match a corresponding one of the first plurality of physical locations 18, the LBA is associated with invalid user data (step 40). If the current physical location matches a corresponding one of the first plurality of physical locations 18, the LBA is associated with valid user data (step 40).

Figure 3B:
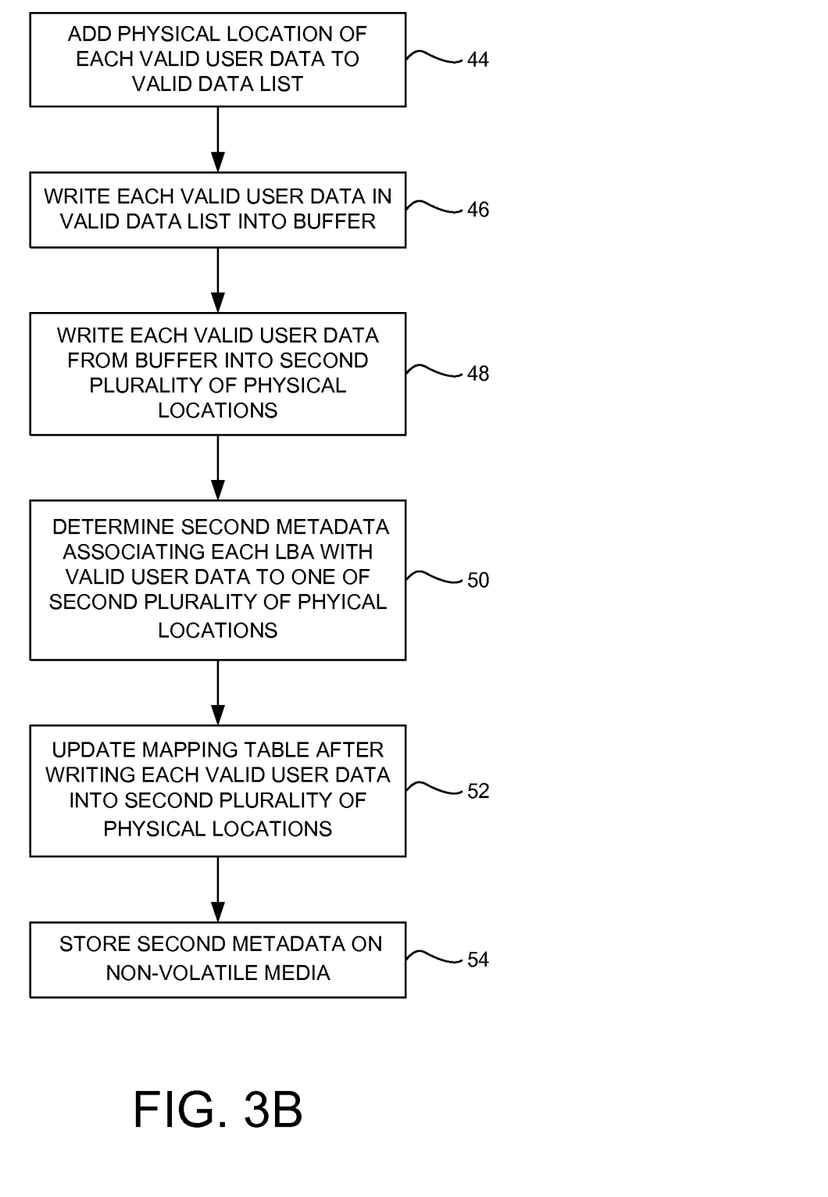
FIG. 3B is a flow diagram according to an embodiment of the present invention wherein each valid user data is migrated to one of a second plurality of physical locations and second metadata is determined associating each LBA with valid user data to one of the second plurality of physical locations.

FIG. 3B is a flow diagram according to an embodiment of the present invention which extends the flow diagram of FIG. 3A. In the embodiment of FIG. 3B, the control circuitry 24 adds the physical location of each valid user data to a valid data list (step 44). For example, the valid data list can indicate the physical location of each valid user data. In an embodiment of the invention, the valid data list resides in SM 28. In one embodiment, the valid data list is located in non-volatile semiconductor memory (e.g., Flash memory) in the disk drive. The control circuitry 24 then reads the data associated with each physical location in the valid data list and writes it into the buffer (step 46). Then the control circuitry 24 writes the valid user data from the buffer into a second plurality of physical locations 20 on the disk surface 4 (step 48). In one embodiment, the second plurality of physical locations 20 is located at the head of a circular buffer on the disk surface 4. In an embodiment of the present invention, the control circuitry 24 sequentially writes in one direction the valid user data into the second plurality of physical locations 20 on at least one of tracks 16 on the disk surface 4.

In the embodiment shown in the flow diagram in FIG. 3B, the control circuitry 24 determines second metadata associating each LBA with valid user data to one of the second plurality of physical locations 20 (step 50). In one embodiment, the control circuitry 24 determines the second metadata prior to writing each valid user data into the second plurality of physical locations 20. The control circuitry 24 updates the mapping table after writing each valid user data into the second plurality of physical locations 20 (step 52). In the embodiment in FIG. 3B, the control circuitry 24 stores the second metadata on the non-volatile media (e.g., disk surface 4) (step 54). In one embodiment, the second metadata is stored in at least one of the second plurality of physical locations 20. In another embodiment, the second metadata is stored in non-volatile semiconductor memory (e.g., Flash memory) in the disk drive.

It is noted that the steps in the flow diagrams in FIGS. 3A and 3B are shown in a particular order to illustrate an embodiment of the present invention. In other embodiments, the steps in the flow diagrams in FIGS. 3A and 3B may be performed in a different order.

Any suitable control circuitry 24 may be employed in the embodiments of the present invention, such as any suitable integrated circuit or circuits. For example, the control circuitry 24 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 24 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk surface 4 and read into a volatile semiconductor memory when the disk drive is powered on. In yet another embodiment, the control circuitry 24 comprises suitable logic circuitry, such as state machine circuitry.

What is claimed is:

1. A data storage device comprising:
    a non-volatile media comprising a first and a second plurality of physical locations, the first plurality of physical locations storing user data and the non-volatile media storing first metadata associating each of the first plurality of physical locations with a logical block address (LBA);
    a mapping table comprising a mapping of each LBA to a current physical location; and
    control circuitry operable to:
        read the first metadata to obtain a first plurality of LBAs;
        read the mapping table to determine a current physical location for the first plurality of LBAs; and
        compare the current physical location from the mapping table of each of the first plurality of LBAs to a corresponding one of the first plurality of physical locations to identify valid user data in the first plurality of physical locations for migration into the second plurality of physical locations, wherein the valid user data is user data in a physical location of the first plurality of physical locations that matches the current physical location.

2. The data storage device as recited in claim 1, wherein the control circuitry is further operable to:
    write the valid user data into the second plurality of physical locations, and
    determine second metadata associating each of the first plurality of LBAs associated with valid user data to a corresponding one of the second plurality of physical locations.

3. The data storage device as recited in claim 2, wherein the control circuitry is further operable to update the mapping table after writing each valid user data into the second plurality of physical locations.

4. The data storage device as recited in claim 2, wherein writing the valid user data into the second plurality of physical locations occurs during a garbage collection operation.

5. The data storage device as recited in claim 2, wherein the non-volatile media comprises a disk surface comprising a circular buffer having a head and a tail, and wherein the first plurality of physical locations is located at the tail of the circular buffer and the second plurality of physical locations is located at the head of the circular buffer.

6. The data storage device as recited in claim 2, where the control circuitry is further operable to write the second metadata into one of the second plurality of physical locations.

7. The data storage device as recited in claim 2, wherein the non-volatile media comprises a disk surface comprising a first zone comprising a first plurality of tracks and a second zone comprising a second plurality of tracks, and wherein the first plurality of physical locations are located on at least one of the first plurality of tracks and the second plurality of physical locations are located on at least one of the second plurality of tracks.

8. The data storage device as recited in claim 7, wherein the control circuitry is further operable to sequentially write in one direction the valid user data into the second plurality of physical locations on at least one of the second plurality of tracks.

9. The data storage device as recited in claim 7, wherein the control circuitry is further operable to write the second metadata on at least one of the second plurality of tracks.

10. The data storage device as recited in claim 1, wherein the control circuitry is further operable to:
    add the physical location of each valid user data to a valid data list; and
    write each valid user data in the valid data list into the second plurality of physical locations.

11. The data storage device as recited in claim 1, further comprising a semiconductor memory comprising a buffer, wherein the control circuitry is further operable to:
    write each valid user data from a corresponding one of the first plurality of physical locations into the buffer; and
    write each valid user data from the buffer into one of the second plurality of physical locations.

12. The data storage device as recited in claim 1, wherein the control circuitry is further operable to:
    determine second metadata associating each of the first plurality of LBAs with valid user data to a corresponding one of the second plurality of physical locations; and
    write the valid user data and the second metadata into the second plurality of physical locations.

13. A method of operating a data storage device, the data storage device comprising a non-volatile media comprising a first and a second plurality of physical locations, the first plurality of physical locations storing user data and the non-volatile media storing first metadata associating each of the first plurality of physical locations with a logical block address (LBA), and a mapping table comprising a mapping of each LBA to a current physical location, the method comprising:
    reading the first metadata to obtain a first plurality of LBAs;
    reading the mapping table to determine a current physical location for the first plurality of LBAs; and
    comparing the current physical location from the mapping table of each of the first plurality of LBAs to a corresponding one of the first plurality of physical locations to identify valid user data in the first plurality of physical locations for migration into the second plurality of physical locations, wherein the valid user data is user data in a physical location of the first plurality of physical locations that matches the current physical location.

14. The method as recited in claim 13, further comprising:
writing the valid user data into the second plurality of physical locations, and
determining second metadata associating each of the first plurality of LBAs associated with valid user data to a corresponding one of the second plurality of physical locations.

15. The method as recited in claim 14, further comprising updating the mapping table after writing each valid user data into the second plurality of physical locations.

16. The method as recited in claim 14, further comprising writing the valid user data into the second plurality of physical locations during a garbage collection operation.

17. The method as recited in claim 14, wherein the non-volatile media comprises a disk surface comprising a circular buffer having a head and a tail, and wherein the first plurality of physical locations is located at the tail of the circular buffer and the second plurality of physical locations is located at the head of the circular buffer.

18. The method as recited in claim 14, further comprising writing the second metadata into one of the second plurality of physical locations.

19. The method as recited in claim 14, wherein the non-volatile media comprises a disk surface comprising a first zone comprising a first plurality of tracks and a second zone comprising a second plurality of tracks, and wherein the first plurality of physical locations are located on at least one of the first plurality of tracks and the second plurality of physical locations are located on at least one of the second plurality of tracks.

20. The method as recited in claim 19, further comprising sequentially writing in one direction the valid user data into the second plurality of physical locations on at least one of the second plurality of tracks.

21. The method as recited in claim 19, further comprising writing the second metadata on at least one of the second plurality of tracks.

22. The method as recited in claim 13, further comprising:
adding the physical location of each valid user data to a valid data list; and
writing each valid user data in the valid data list into the second plurality of physical locations.

23. The method as recited in claim 13, wherein:
the data storage device further comprises a semiconductor memory comprising a buffer; and
further comprising:
writing each valid user data from a corresponding one of the first plurality of physical locations into the buffer; and
writing each valid user data from the buffer into one of the second plurality of physical locations.

24. The method as recited in claim 13, further comprising:
determining second metadata associating each of the first plurality of LBAs with valid user data to a corresponding one of the second plurality of physical locations; and
writing the valid user data and the second metadata into the second plurality of physical locations.

* * * * *